April 7, 1959   V. FERRARA   2,880,874
FILTER SWEEP AGITATOR
Filed Oct. 26, 1956   2 Sheets-Sheet 1

INVENTOR.
VINCENT FERRARA
BY
McMorrow, Berman & Davidson
ATTORNEYS

April 7, 1959 V. FERRARA 2,880,874
FILTER SWEEP AGITATOR
Filed Oct. 26, 1956 2 Sheets-Sheet 2
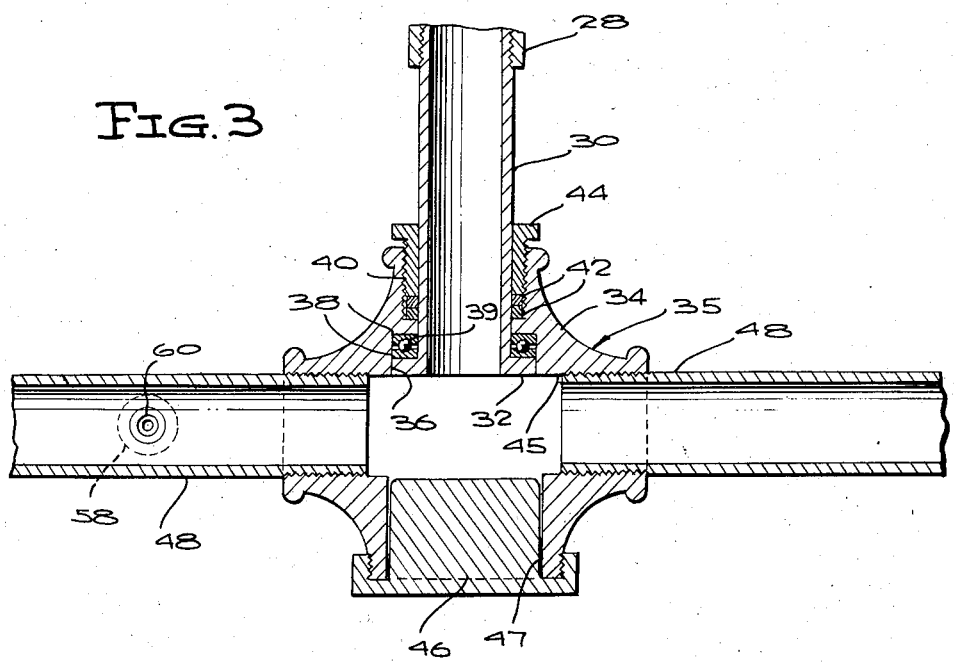
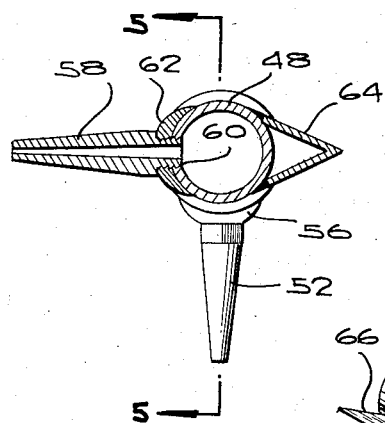
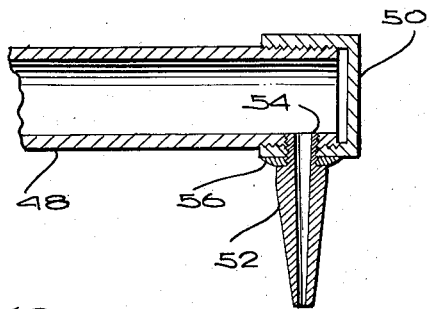
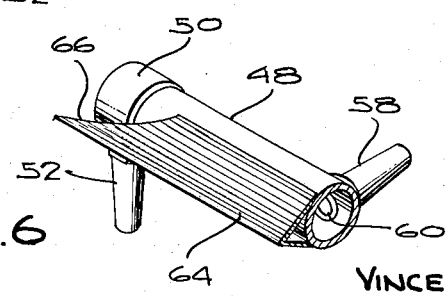
INVENTOR.
VINCENT FERRARA
BY
McMorrow, Berman & Davidson
ATTORNEYS United States Patent Office 2,880,874
Patented Apr. 7, 1959

2,880,874

FILTER SWEEP AGITATOR

Vincent Ferrara, Reading, Pa.

Application October 26, 1956, Serial No. 618,477

2 Claims. (Cl. 210—272)

This invention relates generally to water treatment apparatus, such as is used in filtration plants. More particularly, the invention has reference to a filter sand cleaner or agitator, having the purpose of washing sand in a filter bed.

In a filter bed, there is at the bottom thereof a layer of coarse gravel. Above the coarse gravel there is a layer of sand, and it is necessary to back-wash the sand. This is done by agitation of the sand, and rotary agitators are conventionally employed. Typical examples of the agitators already in use are those found in U.S. Patents Nos. 2,309,916 dated February 2, 1943, and 2,309,917 issued on the same date, both patents being issued to C. E. Palmer.

It has been found that agitators of the type shown in the mentioned patents have certain deficiencies. For example, considerable friction is created during rotation of the agitator within the filter bed, so that there is a corresponding reduction in efficiency, due to a loss of speed during rotation of the agitating device.

One important object is to provide an agitator of the character described that will rotate at a substantially greater speed, under a given application of power, than other agitating devices already in use, with friction losses being cut to a minimum during back-washing of a filter bed.

Another object is to provide a filter sweep agitating device with an unrestricted, jet propulsion action that will be adapted to clean the sand with substantially greater efficiency than similar devices already in use.

A further object is to provide improved nozzles on the agitating device, particularly adapted to be removed with speed and ease for replacement or cleaning.

Yet another object is to provide, in an agitating device of the character described, a bearing and an arm-supporting T, formed as a unitary assembly as distinguished from conventional devices already in use, wherein these components are separate parts.

A further object is to provide a generally improved agitating device of the character stated that will rotate much faster under sand or other filter media than the devices already in use, will provide at the same time, better agitation than the prior art devices, and will, over a given period of time, and under a given application of power, produce cleaner sand, thus to effect a considerable saving in wash water and time.

Other objects will appear from the following description, the claims appended thereto, and from the annexed drawing, in which like reference characters designate like parts throughout the several views, and wherein:

Figure 3 is an enlarged, detail sectional view through the bearing on line 3—3 of Figure 1;

Figure 4 is an enlarged transverse sectional view through one of the arms on line 4—4 of Figure 2;

Figure 5 is an enlarged detail sectional view substantially on line 5—5 of Figure 4; and Figure 6 is an enlarged, fragmentary perspective view showing the outer end portion of one of the arms.

Figure 1:
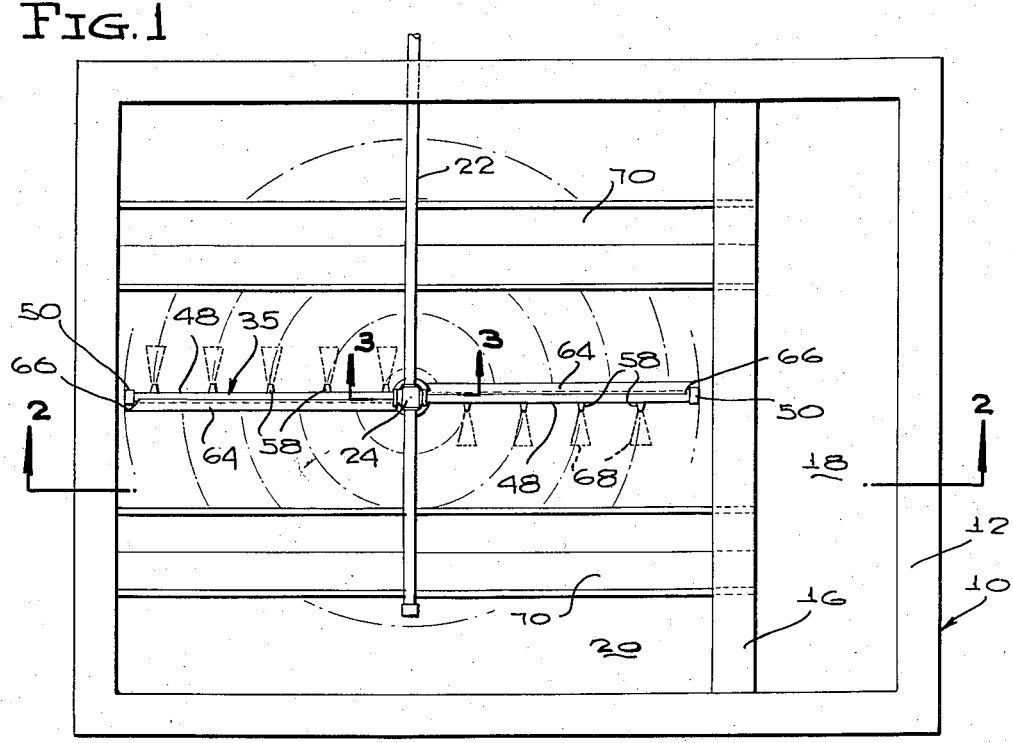
Figure 1 is a top plan view of a filter bed in which is mounted an agitating device according to the present invention.
Figure 2:
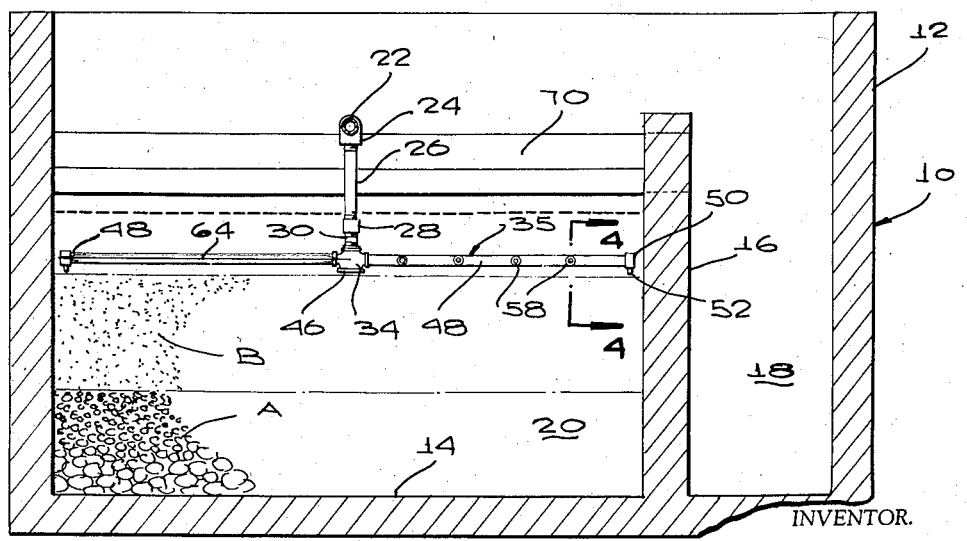
Figure 2 is a sectional view through the filter bed on line 2—2 of Figure 1.

Referring to the drawing in detail, designated generally at 10 is a filter bed having a side wall 12, a bottom 14 and a partition wall 16 spaced inwardly from and extending parallel to one of the walls of the filter bed to define a flume 18.

The area of the bed within which the sand is washed has been designated at 20, and in the bottom of this area there is a deposit of coarse gravel A, over which there is a layer of sand B that is to be washed.

The water supply pipe, whereby wash water is fed to the filter bed, has been designated at 22, with the water being fed under substantial pressure therethrough into a coupling 24, to which is connected a depending connecting pipe 26 having at its lower end a pipe coupling 28 in turn connected to a tubular, depending spindle 30 (see Figure 3) formed at its lower, outlet end with an outwardly directed support flange 32.

A support body 34 of the distributor 35 that constitutes the present invention is formed intermediate its upper and lower ends with a cruciform passage lying in a horizontal plane, into the center of which passage the tubular supporting spindle 30 opens. The spindle 30 extends downwardly through an upwardly opening vertical bore formed in the upper end portion of the body 34, which bore communicates between the upper surface of the body 34 and the center portion of the mentioned cruciform passage, said bore having at its inner end, a counterbore 36 in which are engaged complementary bearing races 38 between which are disposed bearing elements 39, which elements may be carried in a suitable cage or the like, not shown.

The outer end portion of the vertical bore into which spindle 30 extends is counterbored and threaded as at 40, and in the base of the counterbore there are provided packing rings 42 or equivalent leak-preventing means, compressed by a packing nut 44 threaded into the counterbore 44 and circumposed about the spindle 30.

The cruciform passage has been designated at 45, and in effect, constitutes a plurality of radial bores extending from the hollow center of the body 34 to the outer surface of the body, said bores being threaded at their outer ends to receive complementarily threaded inner ends of elongated tubular nozzle support arms 48.

To permit the connection of the spindle to the body in the arrangement shown in Figure 3, wherein the flange 32 engages against the under side of the bearing, there is provided a bottom opening 47 of the body 34, which, after the body has been applied to the spindle, is closed by a plug 46.

Arms 48 radiate from the body as shown in Figure 1, terminating at their outer ends in closely spaced relation to the walls of the area of the filter bed in which the sand is to be washed. The arms are angularly spaced 90 degrees apart about the axis of rotation of the body, and are formed open at their outer ends, the outer ends of the arms being closed (see Figure 5) by end caps 50.

End nozzles 52 extend vertically downwardly from the outer extremities of the arms 48, and have reduced threaded inner end portions 54 threadedly engaged in openings provided in the under sides of the arms 48. The reduced extensions 54 also threadedly engage in openings provided in the side walls of the several caps 50, and extend through weldlets 56.

The end nozzles are provided for the purpose of directing jets of wash water straight downwardly, to thoroughly agitate the marginal portion of the area in which sand B is being washed, with the several downwardly projecting end nozzles traveling in a common circular path.

Uniformly spaced longitudinally of each arm 48 are back-washing nozzles 58. These, as shown in Figure 4, have reduced threaded extensions 60 at their inner ends threadedly engaged in openings formed in the arms 48, weldlets 62 being applied to build up the thickness of the arms where the nozzles 58 are attached. The nozzles 58, of course, are readily removable, as are the end nozzles 52.

The nozzles 58 discharge rearwardly, in the sense of direction of rotation of the agitator, which direction is counterclockwise in Figure 1. Further, the nozzles 58 extend in the plane of rotation of the several arms 48, and discharge in said planes.

In accordance with the invention, mounted on the leading sides of the arms are end-to-end fins 64 (see Figures 4 and 6). These are of V-shaped cross section, with their apices projecting forwardly in the sense of direction of rotatable movement of the arms. The fins, along their respective longitudinal edges, are welded to the arms 48, with the welds being smoothed off, so that the outer surfaces of the fins merge smoothly into the top and bottom surfaces of the arms 48. In other words, the top and bottom surfaces of each fin (see Figure 4), lie in planes tangential to the arms 48 at the top and bottom surfaces of the arms.

Referring to Figure 6, at their outer ends fins 64 have prolongations 66, extending the length of the fins to such a degree that the fins will extend in front of the end caps 50.

The result of this arrangement is that friction losses are reduced to a marked degree during the rotation of the agitator, with the fins knifing through the sand easily, thereby to effect rotation of the agitator at maximum speed, with the speed being substantially increased above the speed of distributors not having these features of the invention, assuming the amount of power supplied to be the same in both instances.

Another important characteristic of the invention resides in the fact that the bearing, and the connection of the several radial arms to the source of wash water, is a unitary assembly, as shown in Figure 3, as distinguished from prior arrangements, in which the bearing has been spaced above the T to which the arms have generally been connected, the bearing and the T thus usually being separate parts vertically spaced along the water supply pipe depending from pipe 22.

The jets of water issuing from the nozzles 58 have been designated at 68, and effect a highly efficient back-washing of the filter bed, producing cleaner sand in less time, due to the previously mentioned reduction in friction losses, the use of the combined bearing and arm connecting assembly, and the provision of the downwardly discharging end nozzles 52.

At 70 there have been designated the usual troughs or gutters, extending above the rotor. These do not constitute part of the present invention and are illustrated merely to show the rotor in its ordinary environment.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A rotary agitator for cleaning the sand of a filter bed by the back wash method, comprising: a vertical, tubular spindle through which wash water is supplied under pressure; combined bearing and support means comprising a hollow bearing member rotating on said spindle and formed with radial bores communicating with the bore of the spindle; a plurality of tubular arms engaged in said bores of the bearing member and radiating from the bearing member; nozzles spaced longitudinally of the arms and discharging backwardly in the sense of direction of the rotation of the arms and bearing members; caps mounted upon the outer ends of said arms and having outer diameters greater than the outer diameters of the arms; second nozzles communicating with the interiors of the arms and projecting downwardly from said caps in paths effective to discharge wash water perpendicularly to the paths in which the water is discharged from said first nozzles; and means mounted on the surfaces of the orifices that are leading in said sense of direction, adapted to reduce frictional losses occurring during rotatable movement of the arms through the filter bed, comprising fins extending from end to end of the arms and formed to a V-shaped cross section with their apices leading in said sense of direction, said fins having rear longitudinal edge portions fixedly secured to the respective arms over a distance beginning at the inner ends of said arms and terminating short of and in closely spaced relation to the caps, the fins having at their outer ends prolongations extending in front of and spaced away from the respective caps, said prolongations comprising triangularly shaped extensions of the outer ends of the fins, the leading edges of the extensions being aligned longitudinally with the leading edges of the remaining portions of the lengths of the fins, the trailing edges being extended obliquely to the length of the fins and extending into convergence with said leading edges of the extensions at locations directly in front of and spaced forwardly from the outer extremities of the caps.

2. A rotary agitator for cleaning the sand of a filter bed by the back wash method, comprising: a vertical, tubular spindle through which wash water is supplied under pressure; combined bearing and support means comprising a hollow bearing member rotating on said spindle and formed with radial bores communicating with the bore of the spindle; a plurality of tubular arms engaged in said bores of the bearing member and radiating from the bearing member; nozzles spaced longitudinally of the arms and discharging backwardly in the sense of direction of the rotation of the arms and bearing members; end caps mounted upon the arms at the outer ends thereof, said end caps being internally threaded and the arms having external threads complementing those of the caps for detachable connection of the arms to the caps, the arms and caps having openings in their side walls registering in one position to which the caps are rotated on the arms; and additional nozzles formed with reduced, threaded inner end portions threadedly engaged in the registering openings for locking the caps to the arms against rotation relative to the arms, said last named nozzles discharging vertically, downwardly in paths normal to the paths in which the first named nozzles discharge.

References Cited in the file of this patent

UNITED STATES PATENTS

| 243,212 | Clark | June 21, 1881 |
| 2,309,917 | Palmer | Feb. 2, 1943 |

FOREIGN PATENTS

| 135,550 | Germany | Mar. 16, 1901 |
| 181,044 | Great Britain | June 6, 1922 |